United States Patent
Homsany (10) Patent No.: US 9,582,545 B2
(45) Date of Patent: Feb. 28, 2017

(54) SYSTEMS AND METHODS FOR OPTIMIZING FILE DISPLAY FOR USERS

(71) Applicant: Dropbox, Inc., San Francisco, CA (US)

(72) Inventor: Ramsey Homsany, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 935 days.

(21) Appl. No.: 13/722,762

(22) Filed: Dec. 20, 2012

(65) Prior Publication Data

US 2014/0181090 A1    Jun. 26, 2014

(51) Int. Cl.
 *G06F 17/30* (2006.01)

(52) U.S. Cl.
 CPC .... *G06F 17/3053* (2013.01); *G06F 17/30126* (2013.01)

(58) Field of Classification Search
 None
 See application file for complete search history.

(56) References Cited

U.S. PATENT DOCUMENTS

| | | | | |
|---|---|---|---|---|
| 7,783,632 B2* | 8/2010 | Richardson | | G06F 17/30864 707/727 |
| 8,019,777 B2* | 9/2011 | Hauser | | G06F 17/30867 707/723 |
| 2007/0005587 A1* | 1/2007 | Johnson | | G06F 17/3053 |
| 2007/0100824 A1* | 5/2007 | Richardson | | G06F 17/30864 |
| 2008/0071763 A1* | 3/2008 | Ferrenq | | G06F 17/30867 |
| 2008/0077631 A1* | 3/2008 | Petri | | G06F 17/2205 |
| 2008/0243830 A1* | 10/2008 | Abhyanker | | G06F 17/30696 |
| 2009/0125511 A1* | 5/2009 | Kumar | | G06Q 10/107 |
| 2009/0157843 A1* | 6/2009 | Apparao | | G06F 17/30035 709/217 |
| 2009/0287692 A1* | 11/2009 | Ookuma | | G06F 17/30011 |
| 2013/0097115 A1* | 4/2013 | Savage | | G06F 17/30014 707/610 |
| 2013/0138637 A1* | 5/2013 | Bachtiger | | G06F 17/30023 707/723 |

* cited by examiner

*Primary Examiner* — Tyler Torgrimson
(74) *Attorney, Agent, or Firm* — Polsinelli PC (57) ABSTRACT

A system for optimizing the manner in which a listing of files is displayed to a user. In various embodiments, the system is configured to display the files based at least in part on a number of times the user has shared the files with other users of the system. In other embodiments, the system is configured to display the files based at least in part on the number of times the user has accessed the files or the number of times users with whom the files have been shared have accessed the files. In particular embodiments, the system displays files based at least in part on an amount of time that the user has accessed the files, that any user of the system has accessed the files, or that other users with whom that user has shared the files have accessed the files.

21 Claims, 5 Drawing Sheets

Content Management Service

Wedding Pictures — 405, 410

| Name | Size — 420 | Modified — 430 |
|---|---|---|
| 102 - Us & Atlanta Cousins.jpg | 2.96 MB | 1 min ago |
| 107 - Jun03556.jpg | 2.01 MB | 13 secs ago |
| 230 - Cousins Table.jpg | 2.09 MB | 59 secs ago |
| 242 - Kids Table.jpg | 3.04 MB | 1 min ago |
| 380 - Us under Chupah.jpg | 3.25 MB | 48 secs ago |
| Bride on a Beach.jpg | 57.61 KB | 4 days ago |
| Ring Flowers.jpg | 28.7 KB | 4 days ago |

| Wedding Pictures | | | |
|---|---|---|---|
| Name | Weighted Shares 440 | Size 420 | Modified 430 |
| 102 - Us & Atlanta Cousins.jpg | 22 | 2.96 MB | 1 min ago |
| 107 - Jun03556.jpg | 18 | 2.01 MB | 13 secs ago |
| 230 - Cousins Table.jpg | 12 | 2.09 MB | 59 secs ago |
| 242 - Kids Table.jpg | 11 | 3.04 MB | 1 min ago |
| 380 - Us under Chupah.jpg | 8 | 3.25 MB | 48 secs ago |
| Bride on a Beach.jpg | 2 | 57.61 KB | 4 days ago |
| Ring Flowers.jpg | 1 | 28.7 KB | 4 days ago |

FIG. 5

SYSTEMS AND METHODS FOR OPTIMIZING FILE DISPLAY FOR USERS

BACKGROUND

When accessing files on a computer, users typically wish to locate their most important files as quickly as possible. Typical content management programs merely organize files for display to a user by name, date, time, or file size. However, this approach may not result in the most important files being displayed to the user in a prioritized manner. Accordingly, there is a need for improved systems for optimizing the manner in which file managers display files and folders to a user.

SUMMARY

A computer system, according to particular embodiments, includes at least one processor and memory. In various embodiments, the computer system may be configured to provide, to one or more users, access to one or more files that have one or more attributes. Additionally, the system may be configured to receive, from a particular user of the one or more users, a request to display the one or more files. The computer system may also rank the one or more files based at least in part on the one or more attributes and display the files in order of the ranking. In various embodiments, the one or more attributes may include at least one attribute and may be a number of times the users have accessed the one or more files, a number of times the particular user has shared the one or more files with other users, a time at which the particular user shared the one or more files with other users, a length of time for which the particular user has accessed the one or more files, and/or a length of time for which the users have accessed the one or more files.

A computer system, according to various embodiments, may include at least one processor and memory. The computer system may be part of a cross-platform synchronization and sharing system. In particular embodiments, the computer system may be configured for providing, to one or more users, access to one or more files, the one or more files including a first file and a second file. The computer system may be configured to receive, from a particular user of the one or more users, a request to display the one or more files. In several embodiments, the computer system may determine a length of time for which a first user has accessed the first and second files and rank the first and second files based at least in part on the lengths of time. Finally, the computer system may display the one or more files based at least in part on the ranking.

Non-transitory computer readable media, according to particular embodiments, may store computer-executable instructions for receiving, from one or more users of a file system including one or more files, a request to display the one or more files. The files may have one or more attributes. The non-transitory computer readable media may also store instructions for ranking the one or more files based at least in part on the one or more attributes and displaying the one or more files based at least in part on the ranking. In various embodiments, the one or more attributes may include a length of time for which the one or more users have accessed the one or more files, a number of times the one or more users have accessed the one or more files, a number of times the one or more users have shared the one or more files with at least one other user, and a time at which the one or more users shared the one or more files with the at least one other user.

BRIEF DESCRIPTION OF THE DRAWINGS

Various embodiments of a computer system for optimizing the display of files to user are described below. In the course of this description, reference will be made to the accompanying drawings, which are not necessarily drawn to scale, and wherein:

FIGS. 4-5 shows screen shots of an exemplary optimized file display system.

DETAILED DESCRIPTION

Various embodiments now will be described more fully hereinafter with reference to the accompanying drawings. It should be understood that the invention may be embodied in many different forms and should not be construed as limited to the embodiments set forth herein. Like numbers refer to like elements throughout.

System Overview

In particular embodiments, a system for optimizing file display for users may optimize the manner in which files, folders, or other types of digital content within a content management system or other computer system are displayed to a user. In various embodiments, the system has particular application in the context of a cloud-based content management system in which a plurality of users have access to shared files and/or folders (or other digital content). As described in more detail below, various embodiments are configured to make it easier for a user to more readily view the files and folders within a content management system that are most important to the user or to other users of the content management system. The system may do this by assessing which files are likely to be the most important files/folders from the perspective of the user and then displaying the files/folders in the order of their assessed importance to the user. The system may assess the importance of files/folders based on a variety of different factors, such as the number of times a particular file has been shared or viewed by the particular user, or by a plurality of different users (e.g., all users) within a content management system.

In particular embodiments, the system is configured to track the frequency with which a particular file or folder in the content management system is shared with new users as well as the frequency with which a particular file or folder is opened (e.g., accessed) by any particular user of the shared filed system. In various embodiments, the manner in which the content management system displays files and folders to a particular user when that user is accessing the content management system may be based at least in part on: (1) the number of times that particular user has shared each particular file or folder in the content management system (e.g., provided a link to the file or folder, shared a copy of the file or folder, or otherwise provided another user with access to the file or folder); (2) the number of times that other users have shared each particular file or folder in the content management system; (3) the number of times that a particular file or folder has been accessed (e.g., opened) by the particular user; (4) the number of times that a particular file or folder has been accessed (e.g., opened) by any user of the content management system; and/or (5) any combination of the foregoing. As a particular example, the content management system may display files and folders in descending order based on a number of times each respective file or folder has been shared by the particular user to whom the files are being displayed.

In particular embodiments, the system may be configured to display files and folders to a particular user when that user is accessing the shared content management system based at least in part on: (1) whether or not the user has shared a particular file or folder with another user that the system has determined is a 'friend' of the user; (2) the 'popularity' of the users with whom the particular user has shared the file or folder; (3) whether or not other users have shared the particular file or folder with users that the system has determined are 'friends' with those users; (4) whether other users have shared the particular file or folder with 'popular' users; and/or (5) any combination of the foregoing. As a particular example, if a particular user has shared particular files and folders with a very popular other user (e.g., a user who receives frequent shared files and folders or who shares many files and folders themselves), those files are displayed more prominently (e.g., higher in a list of files or folders) than those files which the particular user has shared with less popular users or hasn't shared at all).

In various embodiments, the system may be configured to determine which users a particular user is 'friends' with. The system may do this, for example, by determining which users a particular user interacts frequently with (e.g., shares files with or receives shared files from). The system may be further configured to assess the popularity of particular users on the web site. The system may assess a user's popularity based, for example, on: (1) the number of friends the user has on various social networking sites; (2) the number of files that the user shares within the content management system; (3) the number of files that other users share with the particular user; and (4) any other suitable factors. In particular embodiments, the system is configured to track the amount of time that a particular file or folder is accessed by a particular user (e.g., the amount of time the particular user spends viewing a particular photo, the amount of time the particular user spends working on a particular document, etc.). In various embodiments, the system is configured to track the amount of time that a particular file or folder is accessed by all users over the entire content management system. In particular embodiments, the system is configured to displays files and folders to a particular user when that user is accessing the content management system based at least in part on the amount of time that particular files and folders have been viewed by either the particular user, other users, or both.

In various embodiments, the system may be configured to display files or folders within the content management system to a particular user when the user is accessing the content management system based at least in part on other factors including: (1) the frequency or number of edits to the particular files or folders by the particular user or other users; (2) the recency or number of views, shares, or edits of the particular file by the particular user or other users; (3) the type of the particular files; and/or (4) the date of creation of the individual files or folders.

In various embodiments, the system may display files and/or folders in an order that is determined based on any combination of the methods and/or factors described above. For example, the system may use a weighted average that favors the recency of edits over the total number of shares, but that still considers both factors when determining how the files are displayed.

Exemplary Technical Platforms

The present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Example System Architecture

Figure 1:
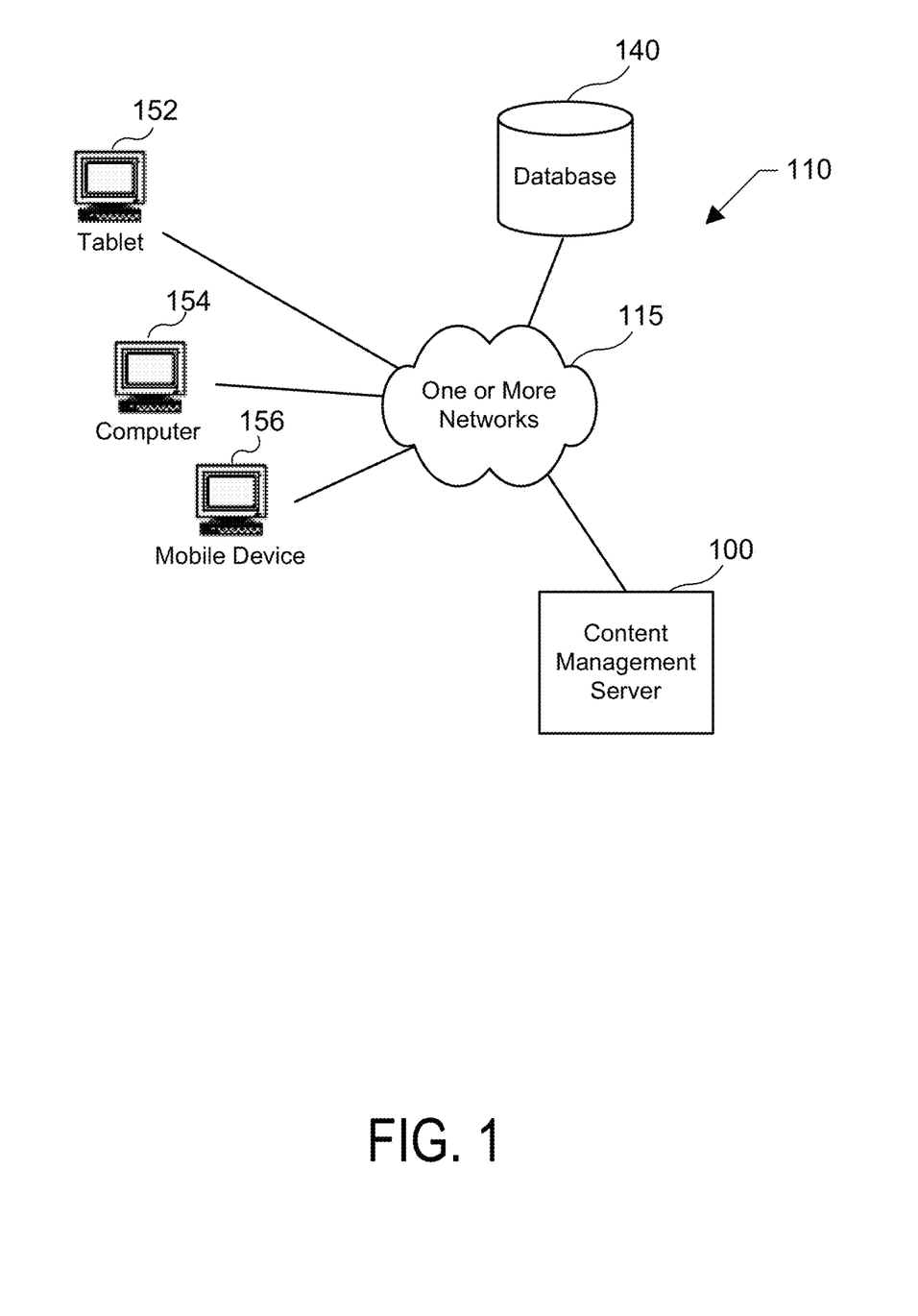
FIG. 1 shows a block diagram of a content management system in accordance with an embodiment of the present system.

FIG. 1 is a block diagram of content management system 110 according to a particular embodiment. As may be understood from this figure, content management system 110 includes remote computing devices such as tablet computer 152, desktop or laptop computer 154, or mobile device 156 (e.g., a handheld device, a laptop, a tablet computer, a cellular phone, a smart phone, or any other device capable of transferring files over network 115) that are in communication with content management server 100 (which, for example, may be used to execute one or more modules as described below) and content management database 140 (which, for example, may be used to store the files on the content management system) via one or more networks 115. Network 115 between content management server 100 and remote computing devices 152, 154, 156 may be, for example, implemented via one or more wired or wireless networks such as LANs, WANs, a cellular network, a Wi-Fi network, or via the Internet. For purposes of ease of explanation and clarity, no specific network is shown in FIG. 1. However, in various embodiments, a cellular tower may be coupled to a cellular network server that is operatively coupled to network 115. The users of each of tablet computer 152, desktop computer 154, and mobile device 156 may have file storage accounts on content management server 100.

In various embodiments, content management server 100 may include one or more servers that are located in close physical proximity, or some servers may be locally together and others remote. In either case, all devices, wherever located, function as a system.

Content management server 100 may enable file access and file storage between content management server 100 and client devices remote computing devices 152, 154, and 156. Content management server 100 may receive files from and send files to remote computing devices 152, 154, 156 consistent with the user's preferences for sharing files. Content management server 100 may act as the counterpart to a client-side file storage service client application user interface that allows a user to manipulate files directly stored on content management server 100. In some embodiments, software operating on remote computing devices 152, 204, 156 may integrate network-stored files with the client's local file system to enable a user to manipulate network-stored files through the same user interface (UI) used to manipulate files on the local file system, e.g., via a file explorer, file finder, or browser application. As an alternative or supplement to the client-side file explorer interface, content management server 100 may provide a web interface for remote computing devices 152, 154 156 to access (e.g. via a web browser) and allow a user to manipulate files stored on content management server 100. In this way, the user can directly manipulate files stored on content management server 100.

In various embodiments, content management database 140 may store files such as those uploaded using remote computing devices 152, 154, 156. It should be understood that, in various embodiments, content management database 140 may include multiple data stores—some local to, and some remote from, content management server 100.

Content management database 140 may maintain, for each user, information identifying the user, information describing the user's file directory, etc. in a file journal that is maintained for each user. In some embodiments, the file journal may be maintained on content management server 100. This file journal may be updated periodically using information obtained directly from content management server 100 and/or from information obtained from one or more remote computing devices 152, 154, 156. In this way, the server-stored file journal on content management server 100 (hereinafter the "server-side file journal") may be updated when a file is changed on the server or on the local client. Content management server 100 then may communicate with one or more remote computing devices 152, 154, 156 to assure that any relevant changes are reflected locally. For example, if a user makes a change to a particular file on a first client device, the change may be reflected in the server-side file journal. The system may then use the server-side file journal to propagate the changes to the file to all client devices associated with the file. Such techniques may be implemented, for example, within the context of a synchronized file system such as the Dropbox™ service of Dropbox, Inc. of San Francisco, Calif.

Figure 2:
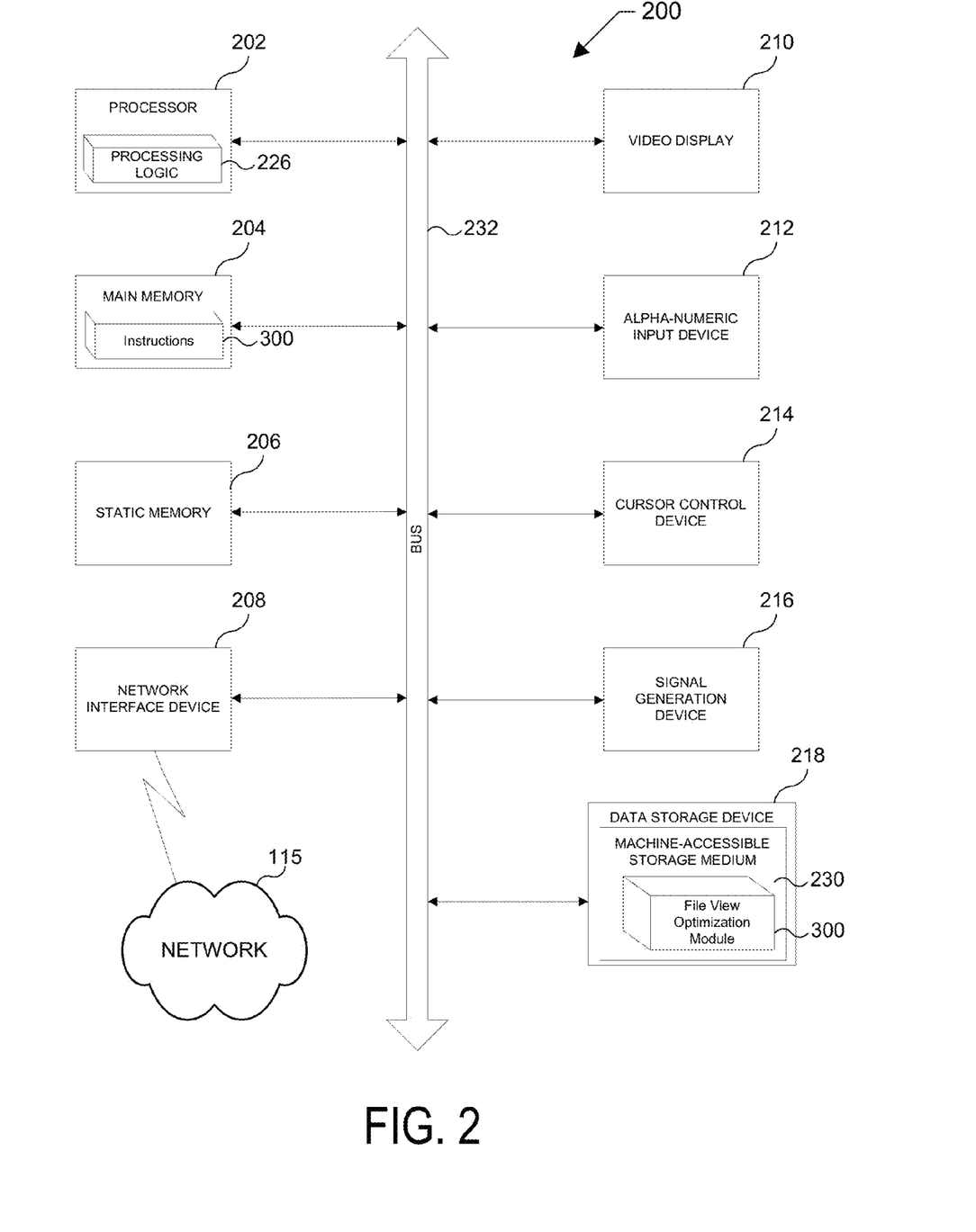
FIG. 2 shows a schematic diagram of a computer, such as the content management server of FIG. 1.

FIG. 2 illustrates a diagrammatic representation of computer 200 that can be used within system 100, for example, as content management server 100, or a client computer 152, 154, and/or 156 (FIG. 1). For purposes of this disclosure, reference to a server or processor shall be interpreted to include either a single server, a single processor, or multiple servers, or multiple processors.

In particular embodiments, computer 200 may be connected (e.g., networked) to other computers by a WAN, LAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC), a tablet PC, a mobile device, a web appliance, a server, a network router, a switch or bridge, and/or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alpha-numeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., File View Optimization Module illustrated in FIG. 3) embodying any one or more of the methodologies or functions described herein. File View Optimization Module may also reside, completely or at least partially, within main memory 204 and/or within processing device 202 during execution thereof by computer 200, main memory 204, and processing device 202 also constituting computer-accessible storage media. Instructions 300 (e.g., File View Optimization Module) may further be transmitted or received over network 115 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical, and magnetic media.

Exemplary System Platform

Various embodiments of a system for optimizing file display for users may be implemented within the context of any suitable content management service (e.g., a synched content management service). In other embodiments, the system may be implemented in the context of a local file storage system (e.g., on any device capable of storing files such as a laptop, personal computer, tablet, server, or other suitable, local file storage system). In other embodiments, the system is implemented within the context of any other suitable system capable of storing files (e.g., any file storage system).

In various embodiments, the system is implemented in a content management service that allows each user to store files in an account associated with the user. In particular embodiments, users of such a content management service can share files or folders from the user's account with other users of the content management service (e.g., by sending a link to the file or folder, by sending a copy of the file or folder to another user, by other users with permission to view, modify, or delete the user's personal copy of the file, or by otherwise providing access to the file or folder).

Various aspects of the system's functionality may be executed by certain system modules, including the system's File View Optimization Module. This module is discussed in greater detail below.

File View Optimization Module

Figure 3:
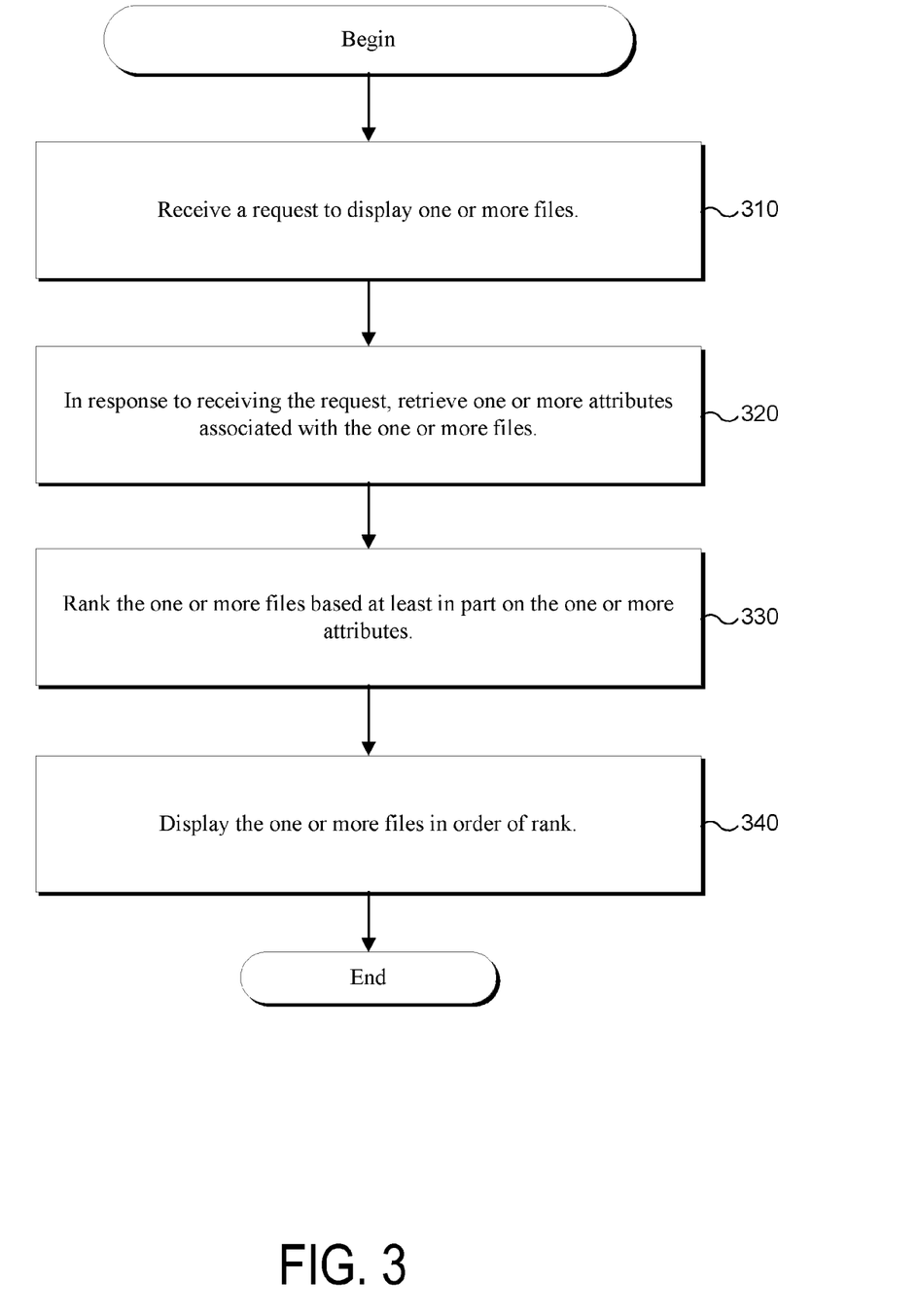
FIG. 3 shows a flow chart that generally illustrates various steps executed by a file view optimization module that, for example, may be executed by the content management server of FIG. 1.

FIG. 3 shows a flow chart that shows steps that may be executed by an exemplary File View Optimization Module. In particular embodiments, the File View Optimization Module may facilitate the optimization of the manner in which files and folders are displayed to users of a content management system.

When executing the File View Optimization Module, the process begins at Step 310 by receiving a request to display one or more files. In various embodiments, the system may receive the request in response to a user accessing a particular folder in a content management system (e.g., a local content management system, a cloud-based, synced content management system, etc.). In other embodiments, the system may receive the request in response to selection, by a user, of an indicia for displaying files or folders, or an indicia for adjusting the order (e.g., sorting) currently displayed files or folders.

The system continues, at Step 320, by, in response to receiving the request, retrieving one or more attributes associated with the one or more files. In various embodiments, the system may retrieve the one or more attributes from metadata associated with the one or more files, or in any other suitable manner. Various attributes associated with the one or more files that the system may retrieve are discussed in greater detail below.

Sharing and Access Attributes

In particular embodiments, the system may be configured to track sharing and access attributes of files and folders in a content management system. These attributes may later be retrieved by file view optimization module. In various embodiments, the system may be configured to track the number of times that a particular file or folder in a content management system has been shared by a user of the content management system. For example, as discussed above, particular content management systems may be configured to allow users of the particular content management system to share files and folders stored in an account associated with the user with (1) other users of the particular content management system; and/or (2) others who are not users of the particular content management system. In various embodiments, the system may be configured to track sharing data associated with any particular file or folder in the content management system such as, for example: (1) the number of times that a particular user (e.g., a user from whom the system received a request to display one or more files at Step 310) has shared the particular file or folder with other users of the particular content management system; (2) the number of times the particular user has shared the particular file or folder with non-users of the particular content management system; (3) the number of times other users of the particular content management system have shared the particular file or folder with other users of the particular content management system; and (4) the number of times other users of the particular content management system have shared the particular file or folder with non-users of the particular content management system. In particular embodiments, this sharing data may be associated with the particular file as an attribute of the particular file.

In various embodiments, the system may be further configured to track file and folder access attributes for the system to retrieve in response to a request to display the files and folders. In particular embodiments, the system may be configured to track access data associated with any particular file or folder in the content management system such as, for example: (1) the number of times that a particular user (e.g., a user from whom the system received a request to display one or more files at Step 310) has accessed the file or folder (e.g., opened the file or folder); (2) the number of times that other users of the particular content management system have accessed the file or folder (e.g., where the file or folder has been shared with the other user, if the other user has the same file or folder in their account in the content management system, etc.); (3) the amount of time the particular user has spent accessing the file or folder (e.g., the amount of time the particular user has spent viewing a particular photo, the amount of time the particular user has spent working on a particular document, etc.); and (4) the amount of time other users of the content management system have spent accessing the file or folder.

Popularity Attributes

In particular embodiments, the system may be configured to track popularity attributes related to users with whom particular files and folders are shared for retrieval by file view optimization module. In various embodiments, the system may be configured to determine which users a particular user is "friends" with. The system may do this, for example, by determining which users a particular user interacts frequently with (e.g., shares files with or receives shared files from). The system may be further configured to assess the popularity of particular users on the web site. The system may assess a user's popularity based, for example, on: (1) the number of friends the user has on various social networking sites; (2) the number of files that the user shares within the content management system, (3) the number of files that other users share with the particular user; and/or (4) any other suitable factors.

Other Attributes

In particular embodiments, the system may retrieve other attributes related to particular files and folders, such as, for example, the frequency or number of times that a particular user or other users has edited a particular file or folder; (2) the recency of views, edits, or shares by the particular user or other users to the particular file or folder; (3) a file type associated with the file (e.g., image file, sound file, word document); (4) the date of creation of the particular file or folder; and/or (5) the name of the particular file or folder.

Returning to FIG. 3, the system continues, at Step 330, by ranking the one or more files based on the one or more attributes. Ranking the one or more files may include, for example, ordering the one or more files based on the one or more attributes retrieved at Step 320. For example, when ranking the one or more files based on the sharing and access attributes discussed above, the system may rank those files that are shared more frequently higher than those files that are shared less frequently. In various embodiments, the system may be configured to rank files that the particular user has shared frequently relatively highly and also rank files that other users have shared frequently relatively highly, but not as highly as those files shared frequently by the particular user.

In particular embodiments, the system may be configured to rank files that are viewed for a greater length of time by users higher than files that are viewed for less time. For example, where the system is ranking a folder full of image files (e.g., such as photographs), the system may be configured to rank those photographs that the particular user and/or other users have spent the most time viewing higher than photographs that users have spent less time viewing.

In particular embodiments, the system may be configured to rank files based on one or more of the popularity attributes discussed above. For example, if there is another user with whom a particular user frequently shares files, the system may rank files shared by the particular user with that other user higher than files shared by the particular user with users with whom the particular user rarely shares files.

In other embodiments, the system may be configured to rank files and folders based on any combination of the attributes and factors discussed above. For example, the system may be configured to rank files based on a number of shares by the particular user, giving greater weight to files that are shared to popular users. For example, the system may rank a file that a user has shared with ten users, none of whom are particularly popular users in the context of the content management system (e.g., the ten users don't frequently share files and are not users with whom files are frequently shared) very highly, but not as highly as a file that the user has shared with seven users, three of whom are popular users.

Returning to FIG. 3, the system continues, at Step 340, by displaying the one or more files in order of rank. In various embodiments, displaying the one or more files in order of rank may place higher ranked (e.g., more popular, more frequently accessed, more frequently shared, most often viewed, etc.) files in a more prominent location or manner than lower ranked files (e.g., on an upper portion of a display screen on which the system displays the one or more files, in a larger font than lower ranked files, etc.). In particular embodiments, the system may be configured to display the one or more files in any suitable manner (e.g., on a display associated with a mobile device, laptop, tablet, etc.).

Exemplary User Experience

Exemplary user interfaces for a particular embodiment of a file view optimization system are shown in FIGS. 4 and 5. These figures represent interfaces displayed on tablet computers, desktop computers, laptops, mobile devices such as smart phones, and other similar devices. These interfaces may be accessed by users of a particular content management system to view files and folders stored in the content management system in an optimized manner.

FIG. 4 shows a screen shot of exemplary user interface 402 for viewing files stored in a particular folder in a content management system. In the embodiment shown in this figure, the system is displaying listing of files 405 in a "Wedding Pictures" Folder that include several .jpeg files of pictures from a wedding. As may be understood from this figure, listing of files 405 may not be sorted by size, modification time, or file name. In the embodiment shown in this figure, listing of files 405 may be displayed based on a ranking determined by the system that is configured to optimize the file view based on various attributes and factors discussed above. In particular embodiments, the system may be configured to display files in a particular folder (e.g., such as the "Wedding Picture" Folder shown in FIG. 4) with the optimized view as the default view (e.g., the view in which the files are initially displayed to a user that accesses the files or folder). In other embodiments, the system may be configured to display the files in an optimized file view in response to the selection of Optimized File View indicia 410 by a user of the system. In such embodiments, the system may initially display the files using any other suitable method (e.g., by creation date, name, etc.). In the embodiment shown in this figure, the system may be configured to allow users sort the files based on other factors such as Size 420 and Modification Time 430 by selecting an associated indicia.

FIG. 5 shows a screen shot of another embodiment of exemplary user interface 402 for viewing files stored in a particular folder in a content management system. In the embodiment shown in this figure, the system may be configured to display particular attributes associated with the various files along with other file information (e.g., file size, modification time, etc.). In this figure, the system displays a number of Weighted Shares 440 of the files in the "Wedding Pictures" folder. Weighted Shares 440 may include, for example, a number of times a particular file in listing of files 405 has been shared by the user viewing the files, by other users of the content management system, or any other suitable measure of sharing (e.g., a weighted measure based on the popularity of those that have shared the files or with whom the files have been shared, etc.).

In particular embodiments, a user interface for viewing files stored in a content management system may include information associated with any of the attributes used for determining an optimized file view or ranking discussed above (e.g., total view time, etc.). In such embodiments, users may be able to sort listing of files 405 based on any such attributes. In addition, users may select Optimized File View indicia 410, which may, for example, rank and/or sort the files based on a combination (e.g., a weighted combination) of any of the attributes discussed above.

ALTERNATIVE EMBODIMENTS

User Rating and Promotion and Demotion of Files within Ranking

In various embodiments, the attributes of a particular file or folder may include a rating of the file or folder, which may, for example, include a user rating (e.g., a rating provided by the particular user requesting to view one or more files or a rating by any other user of the system). In particular embodiments, the rating may be based on a star rating (e.g., on a scale from zero to five stars, a number rating, or any other suitable rating mechanism).

In particular embodiments, the system may be configured to allow users to manually promote or demote particular files within a ranking (e.g., by selecting an option associated with the file to promote or demote the file). In various embodiments, this may allow users to move files up or down in ranking when the user feels that a file is too highly or lowly ranked. The user may elect to adjust the ranking of a file for any suitable reason (e.g., the user may demote a particular photograph if the user doesn't like the particular photograph, where the particular photograph is highly ranked by virtue of frequent shares on the particular photograph by other users.).

Optimized File View in Shared Folders

In particular embodiments in which the system is implemented in a shared folder of a content management system (e.g., a folder to which a plurality of users have permission to access, edit, add, delete, etc. any files or folders in the shared folder), the system may be configured to display the same optimized file view for any user accessing the shared folder. In various embodiments, the system may be configured to rank files and folders in the shared folder based at least in part on the file and folder usage of a plurality of users with access to the shared folder (e.g., taking into account shares, views, edits, etc. of particular files and folders by all members of the shared folder). In other embodiments, the system may be configured to rank files based at least in part on which files have been most recently accessed by any member of the shared folder (e.g., by displaying the files in descending order of access time, where the access is determined by the time at which any member of the shared folder has accessed the file).

Ranking Based on Recency of any of the Above Mentioned Factors

In particular embodiments, the system may be configured to further rank files and folders based at least in part on the recency of any of the factors or attributes discussed above. For example, the system may be configured to rank files based in part on the recency of shares of a particular file by other users, the recency with which a file was viewed for a particularly long time (e.g., a file that was viewed for several hours several months ago may not be ranked as highly as a file that was viewed for twelve minutes yesterday, etc.), etc.

CONCLUSION

Many modifications and other embodiments of the invention may come to mind to one skilled in the art to which this invention pertains having the benefit of the teachings presented in the foregoing descriptions and the associated drawings. While examples discussed above cover the use of the invention in the context a content management service, the invention may be used in any other suitable context. Also, while various examples are described above as being applied to files and folders, it should be understood that the same or similar techniques may be applied to types of digital content other than files or folders, such as a post on a social media web site that is not stored in the form of a file, progress made in a video game where the progress is not saved as part of a file, or the appearance of an avatar that is not stored in the form of a file.

It should also be understood that, in various embodiments, multiple ranking techniques may be used to rank digital content. For example, in particular embodiments, the system may: (1) apply any suitable methodology (e.g., artificial intelligence techniques, or any other suitable methodology) to determine which particular ranking technique to use in ranking one or more sets of digital content; and then (2) use the particular ranking technique to rank the digital content. Accordingly, the system may be configured to dynamically determine which ranking technique is best suited for any particular situation. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A computer-implemented method comprising:
providing, by a processor, to one or more users, access to one or more files, in a shared content management system in an account associated with a particular user of the one or more users, wherein the one or more files are shared with the particular user and the one or more files having one or more attributes;
receiving, by a processor at the shared content management system, from a local client application associated with the shared content management system on a device associated with the particular user, a request to display the one or more files;
in response to the request, dynamically determining a ranking technique, by a processor at the shared content management system, to rank the one or more files utilizing attributes including, an amount of time that a particular file is accessed by a specific user and an amount of time that the particular file is accessed by all users, and a received user ranking;
in response to the determination, automatically ranking the files in a ranked order using the determined ranking technique; and
sending the automatic ranking from the shared content management system to the local client application on the device associated with the particular user, wherein the local client application processes the automatic ranking, thereby allowing the particular user to view the one or more files in the ranked order.

2. The computer-implemented method of claim 1, wherein the attributes further comprise a time at which the particular user shared the one or more files with the one or more users.

3. The computer-implemented method of claim 1, wherein the attributes further comprise a length of time for which the particular user has accessed the one or more files.

4. The computer-implemented method of claim 3, wherein the attributes further comprise a length of time for which the one or more users have accessed the one or more files.

5. The computer-implemented method of claim 1, further comprising allowing the particular user to adjust the ranking of the one or more files.

6. The computer-implemented method of claim 5, wherein the adjusting the ranking comprises allowing the particular user to increase and decrease the ranking of a particular file of the one or more files.

7. A computer system comprising at least one processor, wherein the computer system is configured for:
providing, to one or more users, access to a plurality of files, in a shared content management system in an account associated with a particular user of the one or more users, wherein the plurality of files are shared with the particular user and the plurality of files comprising a first file and a second file;
receiving, at the shared content management system, from a local client application associated with the shared content management system on a device associated with the particular user of the one or more users, a request to display the plurality of files;
determining a length of time for which the particular user has accessed the first file;
determining a length of time for which the particular user has accessed the second file;
determining an amount of time that the first file is accessed by all users;
determining an amount of time that the second file is accessed by all users;
in response to the request, dynamically determining a ranking technique to rank the first and second files utilizing, at least in part, the lengths of time for which the first user has accessed the first and second files, and the amount of time that the first and second files are accessed by all users,
in response to the determination of the ranking technique, automatically ranking the files in a ranked order using the determined ranking technique; and
sending the automatic ranking from the shared content management system to the local client application on the device associated with the particular user, wherein the local client application processes the automatic ranking, thereby allowing the particular user to view the plurality of files in the ranked order.

8. The computer system of claim 7, wherein:
the computer system is further configured for allowing the one or more users to share the plurality of files with one or more other users.

9. The computer system of claim 7, wherein the ranking the first and second files comprises ordering the first and second files in descending order of the length of time for which the particular user has accessed the first and second files.

10. The computer system of claim 7, wherein the computer system is further configured for:
determining a total length of time for which the particular user and a second user have accessed the first file;
determining a total length of time for which the particular and second users have accessed the second file; and
ranking the first and second files based at least in part on the total lengths of time.

11. The computer system of claim 10, wherein:
the computer system is further configured for allowing the one or more users to share the plurality of files with one or more others users; and
the second user is a user with whom the particular user has shared the plurality of files.

12. The computer system of claim 7, wherein the computer system is further configured for:
determining total lengths of time for which the one or more users have accessed the plurality of files; and
ranking the plurality of files based at least in part on the total lengths of time.

13. The computer system of claim 7, wherein the computer system is a synchronized content management system.

14. A non-transitory computer-readable medium storing computer-executable instructions for:
receiving, from a local client application associated with a shared content management system on one or more devices associated with one or more users, a request to display a plurality of files in the shared content management system and the plurality of files are in an account associated with a particular user of the one or more users, and the one or more files are shared with the particular user and, the plurality of files having one or more attributes;
in response to the request, dynamically determining a ranking technique to rank the plurality of files utilizing the attributes of: an amount of time that a particular file is accessed by a specific user, an amount of time that the particular file is accessed by all users, a number of times the particular user has shared the plurality of files with at least one other user, a number of times the one or more users shared the plurality of files with at least one other user, and a received user ranking;
in response to the determination, automatically ranking the plurality of files in a ranked order using the determined ranking technique; and
displaying to the particular user the plurality of files in the ranked order.

15. The non-transitory computer-readable medium of claim 14, wherein the attributes further comprise the number of times the one or more users have accessed the plurality of files.

16. The non-transitory computer-readable medium of claim 15, wherein the one or more attributes comprise a time at which the one or more users shared the plurality of files with the at least one other user.

17. The non-transitory computer-readable medium of claim 14, wherein the shared content management system is a cloud-based content management system.

18. A non-transitory computer-readable medium storing computer-executable instructions for:
receiving, from one or more users of a content management system comprising plurality of pieces of digital content, a request to display the plurality pieces of digital content, in the content management system wherein the content management system is a shared content management system and the plurality of files are in an account associated with a particular user of the one or more users, and the one or more files are shared with the particular user and the plurality of pieces of digital content having one or more attributes;

in response to the request, dynamically determining a ranking technique to rank the plurality of pieces of digital content utilizing attributes including an amount of time that a particular file is accessed by a specific user and an amount of time that the particular file is accessed by all users, at least a number of times the particular user has shared the plurality of pieces of digital content with at least one other user, a number of times the one or more users shared the plurality of pieces of digital content with the at least one other user, and a received user ranking;

in response to the determination, automatically ranking the plurality of pieces of digital content in a ranked order using the determined ranking technique; and displaying to the particular user the plurality of pieces of digital content in the ranked order.

19. The non-transitory computer-readable medium of claim 18, wherein the attributes further comprise a number of times the one or more users have accessed the plurality of pieces of digital content.

20. The non-transitory computer-readable medium of claim 18, wherein the attributes further comprise a time at which the one or more users shared the plurality of pieces of digital content with the at least one other user.

21. The non-transitory computer-readable medium of claim 18, wherein the content management system is a cloud-based content management system.

\* \* \* \* \*